(12) United States Patent
Clayson, III

(10) Patent No.: US 6,289,765 B1
(45) Date of Patent: Sep. 18, 2001

(54) ROLLER FOLLOWER SHAFT RETENTION

(75) Inventor: Ralph Lyle Clayson, III, Grand Rapids, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/399,603

(22) Filed: Sep. 20, 1999

(51) Int. Cl.$^7$ ................................. F16H 53/06; F01L 1/14
(52) U.S. Cl. ...................... 74/569; 123/90.5; 123/90.16
(58) Field of Search .................... 123/90.5, 90.42, 123/90.48, 90.93; 384/584; 74/569

(56) References Cited

U.S. PATENT DOCUMENTS

| | | | |
|---|---|---|---|
| 4,793,295 | * 12/1988 | Downing ............................ | 123/90.5 |
| 5,239,951 | * 8/1993 | Rao et al. ........................... | 123/90.5 |
| 5,273,005 | 12/1993 | Philo et al. . | |
| 5,361,733 | * 11/1994 | Spath et al. ....................... | 123/90.16 |
| 5,385,124 | * 1/1995 | Hillebrand et al. ................. | 123/90.5 |
| 5,775,275 | * 7/1998 | Philo .................................. | 123/90.5 |
| 5,931,133 | * 8/1999 | Giannone et al. .................. | 123/90.5 |

* cited by examiner

Primary Examiner—Vinh T. Luong
(74) Attorney, Agent, or Firm—John A. VanOphem

(57) ABSTRACT

Retention of a roller follower shaft in a follower body is provided by keyed ends formed by flats on the shaft with which a follower roller forms an assembly, together with additional bearings if needed. Slots are provided extending from shaft bore openings through spaced arms of the body to distal ends of the arms. The roller follower assembly is inserted in a pocket between the arms by sliding the keyed ends of the shaft through the slots of the arms to axially align the shaft with the shaft openings. The shaft is then turned about 90 degrees in the openings in which a slight interference fit retains the shaft against lateral motion.

8 Claims, 5 Drawing Sheets

ROLLER FOLLOWER SHAFT RETENTION

TECHNICAL FIELD

This invention relates to roller followers for engines, including cam and other eccentric followers, such as valve lifters, finger followers and rocker arms. More particularly, the invention relates to means and a method for installing and securing a roller shaft against axial or rotational movement within a follower body.

BACKGROUND OF THE INVENTION

It is known in the assembly of roller cam followers, such as for hydraulic valve lifters made in high volume, to support the follower roller on a hardened shaft secured in a transverse bore of the follower body. The shaft is selectively hardened so that the ends are sufficiently ductile to permit plastic deformation. The shaft is retained against lateral motion on the bore by deforming the shaft ends, such as by staking the shaft ends to the body after installation of the shaft therein.

The method works well but requires additional steps for the selective heat treatment of the shaft. Care in assembly is also required to avoid distortion of the body in the staking operation.

SUMMARY OF THE INVENTION

The present invention provides unique means and a method for installing and retaining a roller follower shaft in a follower body which simplifies manufacture and allows the use of various types of materials and configurations for a roller shaft not permitted by the previous arrangement. For example, fully hardened tool steel or ceramic materials may be utilized which cannot be deformed for use with a staking operation. In addition, the shaft diameter may be increased for direct bearing on the roller, as in use of a bronze shaft or for any desired reason, since installation of the roller and shaft assembly is through slots extending laterally from shaft bore openings rather than axially through the shaft openings themselves.

The invention involves keyed ends on the shaft. The keyed ends may be formed by providing flats on opposite sides of otherwise cylindrical ends. The follower body is provided with corresponding slots on inner walls of roller pocket forming arms that extend from the shaft openings laterally to distal ends of the arms.

In assembly, the roller is installed on the shaft together with any additional bearing materials that may be utilized. The resulting assembly is then inserted into the follower body by passing the keyed ends through the slots from the distal end of the body to the final location in alignment with the shaft openings. The shaft is then rotated approximately 90 degrees by a suitable tool or other means so that the keyed ends are misaligned with the slots and the shaft is positively retained in the shaft openings to prevent axial or further rotational motion. The shaft is preferably made to have a slight interference fit within the shaft openings so that the shaft is positively fixed in the installed position. Retention is further aided by friction created by loading of the roller against the shaft and follower body during operation of the roller follower in engine valve gear or other mechanism.

In particular, a roller follower for engines according to the invention includes a follower body adapted for actuating a mechanism of an engine in response to motion of a rotating eccentric. The body includes spaced arms defining an intermediate roller pocket, shaft openings through the arms and aligned on a transverse axis, and opposed parallel slots narrower than the shaft openings and formed in inner sides of the arms. The slots extend from the shaft openings to distal edges of the arms. A roller assembly includes a shaft and a follower roller. The shaft extends on a transverse axis and is supported by the roller upon engagement with an associated eccentric. The shaft includes a cylindrical central portion and ends extending axially from the central portion. The central portion mounts the roller and is received within the pocket. The ends extend into the shaft openings for retaining the roller assembly within the pocket. The ends include a tool engageable portion, and parallel flats slidably receivable within the slots for installing the roller assembly in the pocket from tree distal edges of the arms. The shaft is then rotated a quarter turn by a tool inserted in the tool engageable portion to misalign the flats and slots and engage the shaft with adjacent sides of the shaft openings for retaining the shaft in fixed position in the openings.

Also, according to the invention, a method for assembly and retention of a roller follower in a follower body may comprises the steps of providing a roller shaft assembly with a shaft having keyed ends; assembling the shaft assembly into aligned shaft openings in roller pocket forming arms of a follower body by sliding the keyed ends through lateral slots to the shaft openings from distal ends at edges of the arms; and rotating the shaft in the openings to misalign the keyed ends relative to the slots and fix the shaft position against removal through the slots, the shaft having an interference fit in the openings that retains the shaft in the fixed position against lateral or further rotational motion.

These and other features and advantages of the invention will be more fully understood from the following description of certain specific embodiments of the invention taken together with the accompanying drawings.

DESCRIPTION OF THE PREFERRED EMBODIMENT

Figure 1:
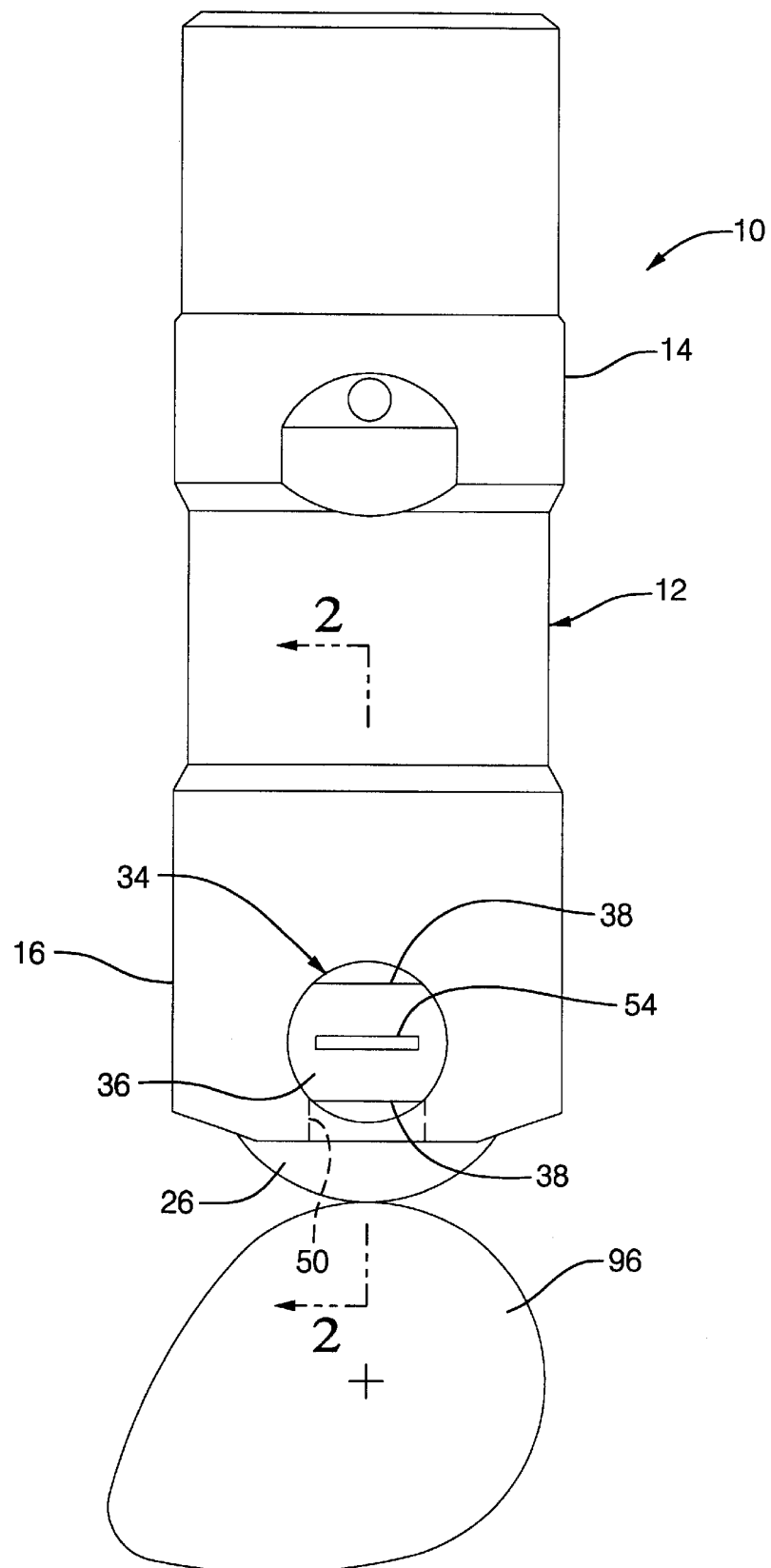
FIG. 1 is a side view of a roller hydraulic valve lifter incorporating shaft retention means according to the invention.
Figure 3:
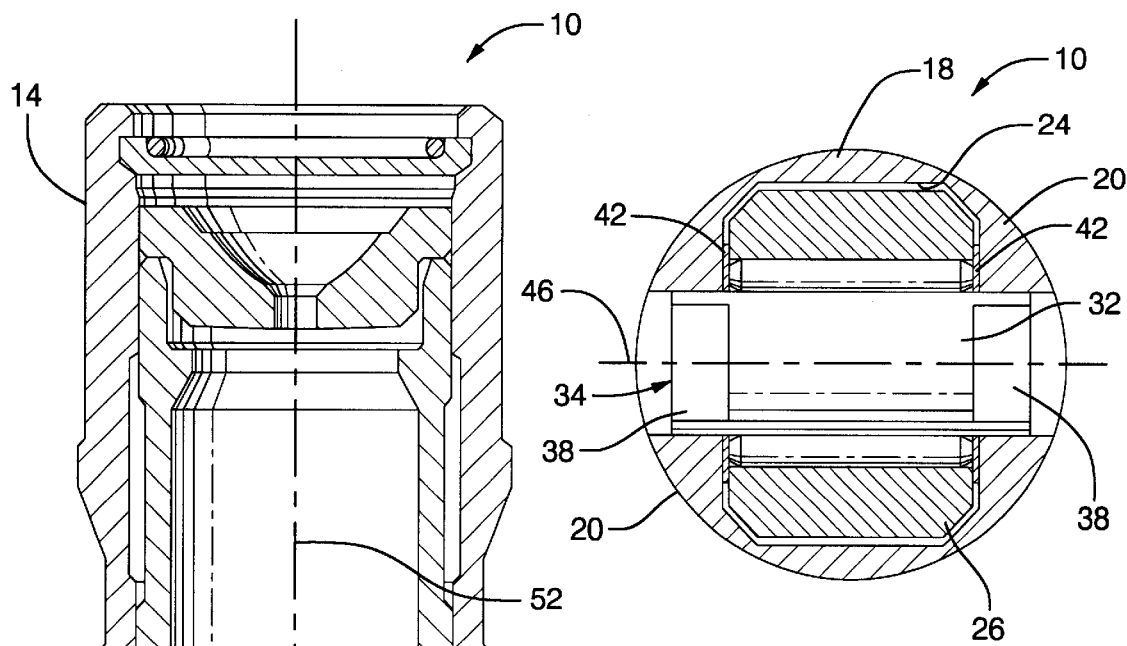
FIG. 3 is a transverse cross-sectional view from the line 3—3 of FIG. 2.
Figure 2:
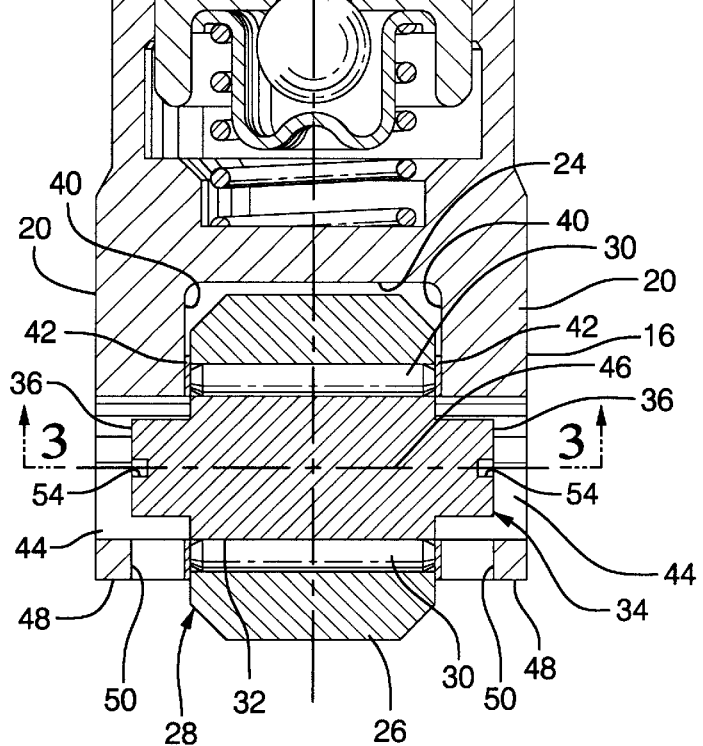
FIG. 2 is a fragmentary longitudinal cross-sectional view from the line 2—2 of FIG. 1 showing a first embodiment of the invention.

Referring first to FIGS. 1–3 of the drawings in detail, numeral 10 generally indicates a roller hydraulic valve lifter engaging an associated eccentric cam 96 as an example of a roller follower in which the shaft retention means of the invention may be applied. Lifter 10 includes a follower body 12 having generally cylindrical upper and lower ends 14, 16.

The lower end 16 has a depending skirt 18 including oppositely disposed axially extending arms 20 which coact with the skirt 18 to form a downwardly open pocket 24 in which is received a follower roller 26.

Roller 26 forms part of a roller shaft assembly 28 that further includes a plurality of needle bearings 30 rolling on an inner periphery of the roller 26 and engaging a cylindrical outer surface of a central portion 32 of a roller shaft 34. Shaft 34 also includes keyed outer ends 36 which are formed by cutting, or otherwise forming, parallel flats 38 on opposite sides of the outer ends 36 to form the key-like shapes that characterize the ends 36.

The roller shaft assembly 28 is received within the pocket 24 between inner sides 40 of the arms 20. Thrust washers 42 are provided between the assembly and the inner sides to retain the needle bearings within the roller and prevent their rubbing against or contacting the sides 40 of the arms 20. The outer ends 36 of the shaft are received within shaft openings 44 that extend through the arms 20 and are aligned on a common transverse axis 46.

Between the openings 44 and the outer or distal ends 48 of the arms 20, opposed parallel slots 50 are cut into the sides 40. The slots 50 extend longitudinally, parallel to a central longitudinal axis 52 of the valve lifter 10. Slots 50 are made with a width and depth sufficient to receive the keyed outer ends 36 of the roller shaft 34, as will be subsequently described. The outer diameter of the roller shaft 34 is preferably sized to provide a slight interference fit of the ends 36 in the shaft openings 44 into which the shaft ends 36 extend so that the shaft is fixed by the interference fit and friction in the installed position illustrated in FIGS. 1–3.

To assemble the roller shaft assembly 28 into the lifter body, the shaft 34 is first inserted into the needle bearings disposed within the roller 26 and the thrust washers are positioned on either side of the roller and the associated needle bearings. The assembly is then positioned with the keyed outer ends of the shaft in alignment with the slots 50 of the follower body arms 20. The shaft ends, with the assembly, are then slid through the slots 50 from the bottom or distal end of the lifter body. The flats 38 of the shaft slide along the sides of the slots 50 until the roller is positioned within the pocket and the shaft 34 is positioned with its axis coaxial with the longitudinal axis 46 of the shaft openings 44 into which the outer ends 36 of the shaft extend.

At this point, the shaft is rotated approximately 90 degrees so that the flats 38 are changed from a vertical position to a horizontal position as shown in the drawings. In this position, the outer diameter of the shaft ends 36 engages, with a slight interference fit, the inner diameters of the shaft openings 44. The shaft is locked in place against lateral motion by reason of the interference fit in the shaft openings 44 and against longitudinal motion by the misalignment of the flats 38 with the slots 50 through which the shaft was installed.

Preferably, the shaft ends are provided with a tool engageable portion such as slot-like recesses 54 engageable by a tool, such as a screwdriver, to cause rotation of the shaft through the preferred 90 degree arc to lock the shaft in position within the shaft openings 44. Other forms of tool connecting devices could, of course, be substituted and, if desired, a special tool could be provided to engage the flats 38 through the open ends of the shaft openings 44 in order to provide the rotational step required.

Figure 4:
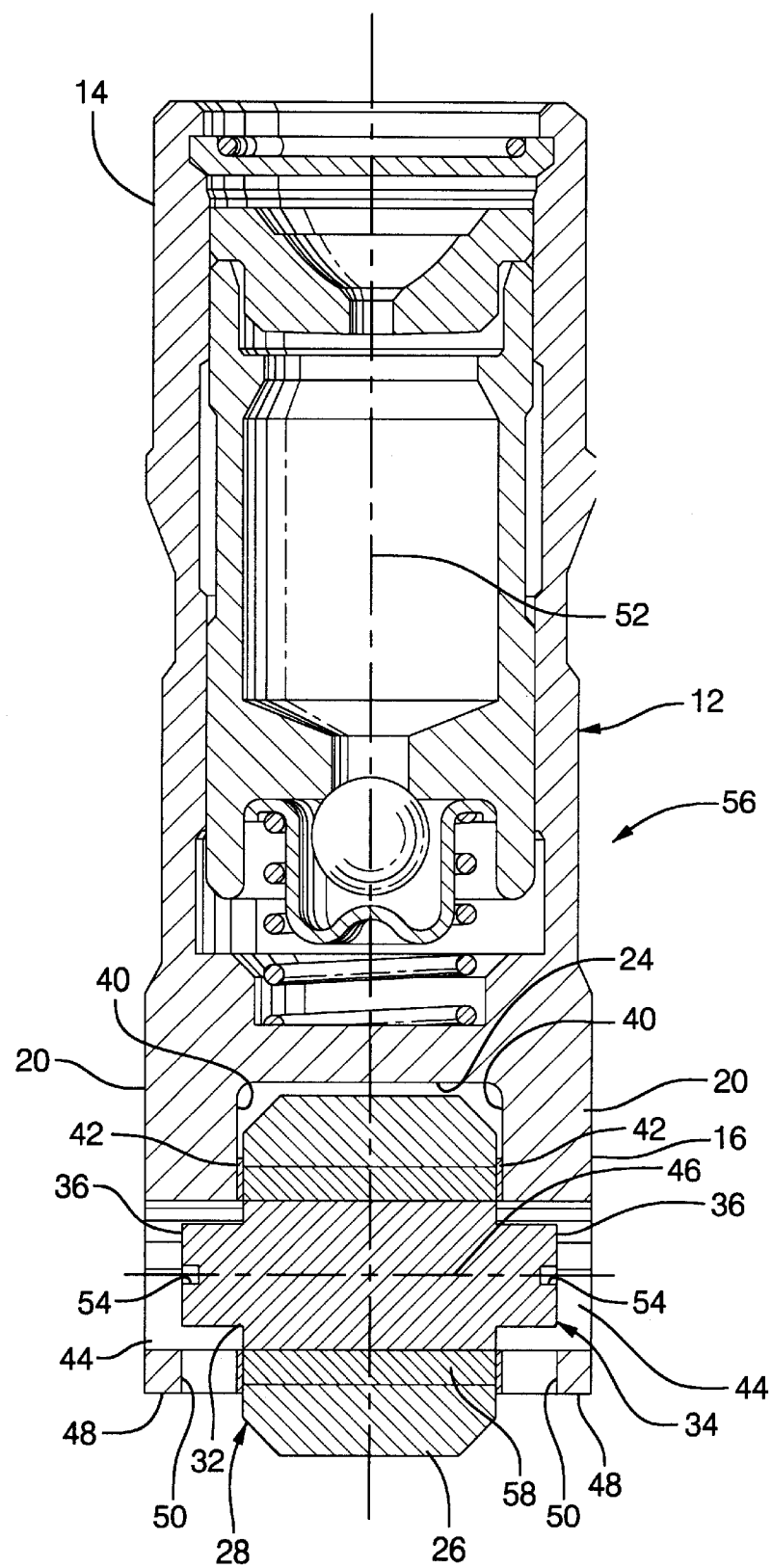
FIG. 4 is a cross-sectional view similar to FIG. 2 but showing an alternative embodiment of the invention.

Referring now to FIG. 4 of the drawings there is shown an alternative embodiment of lifter 56 in which like numerals indicate like parts. The structure is similar to the first described embodiment except that the needle bearings 30 are replaced by a solid bearing sleeve 58 which may be of bronze or other suitable bearing material. Since the sLeeve is a solid ring, the thrust washers 42 of the first embodiment may be omitted.

Figures 5, 6:
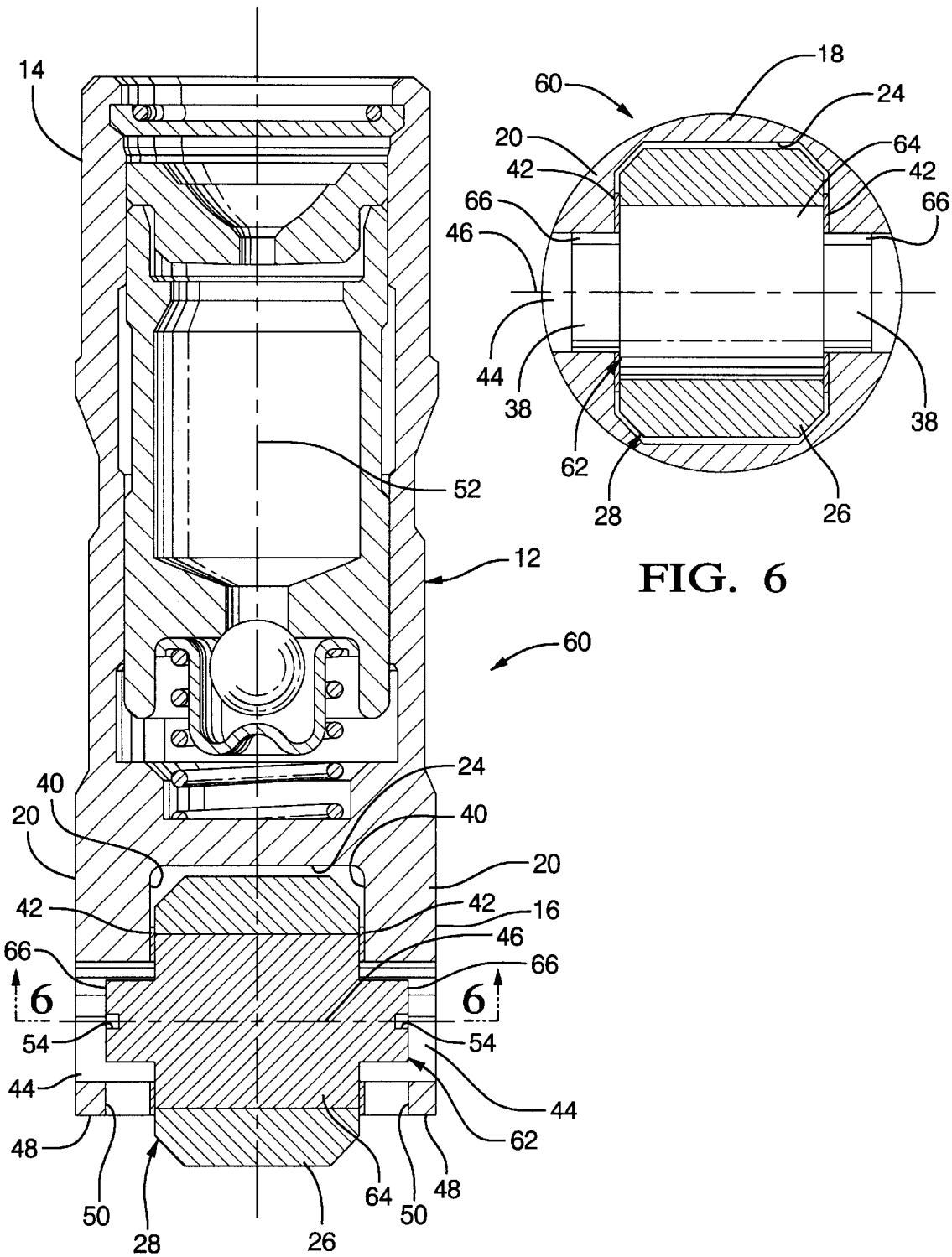
FIG. 5 is a cross-sectional view similar to FIGS. 2 and 4 showing still another alternative embodiment.
FIG. 6 is a transverse cross-sectional view from the line 6—6 of FIG. 5.

FIGS. 5 and 6 illustrate still another embodiment of valve lifter 60 in which like numerals indicate like parts. In lifter 60, the shaft and bearings of the earlier embodiments are replaced by a solid bronze shaft 62. Alternatively, the shaft could be made of ceramic or any other suitable material capable of providing a bearing surface in direct contact with the roller 26. Note that in the assembly, the bronze shaft has an outer diameter of its central portion 64 which is larger than the outer diameter of the keyed outer ends 66. Thus, in this embodiment, the shaft can only be installed through the lower or distal end of the lifter body 12 as opposed to the conventional manner of installation in prior art assemblies wherein the shaft is inserted laterally along the axis 46 of the shaft openings 44.

The other features of lifters 60 and 56, including the flats on the shaft ends and slots in the inner sides of the arms, are similar to those of the first described embodiment so that installation of the roller shaft assembly in each case is essentially the same in the first described embodiment. Further description is thus believed unnecessary.

Figure 7:
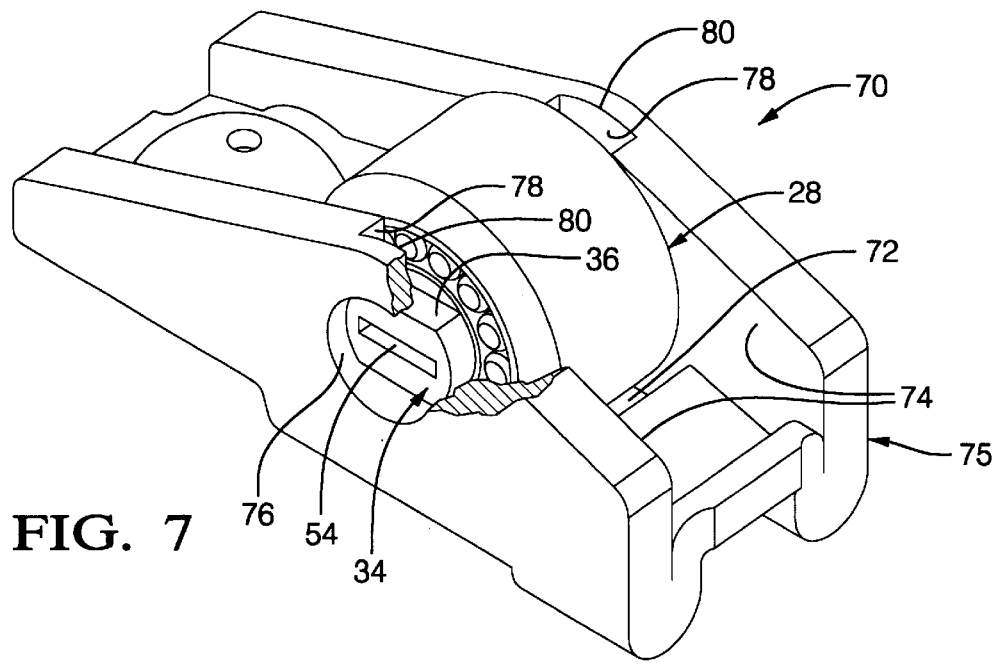
FIG. 7 is a pictorial view partly broken away to show an application of the invention to a roller finger follower.

FIG. 7 of the drawings illustrates the combination of a roller shaft assembly 28 of any of the types in the previously described embodiments with a finger or roller cam follower 70 for actuating engine valve gear. Follower 70 is of conventional construction except that a pocket 72 formed between opposite sides 74 of a follower arm 75 includes shaft openings 76 with slots 78 extending from the openings 76 to distal edges 80 of the sides 74. The slots 78 are provided to receive the keyed ends 36 of any of the roller shafts 34, 62 previously described, so that installation of the roller shaft assembly 28 is accomplished in the manner described in conjunction with the valve lifter.

Figure 8:
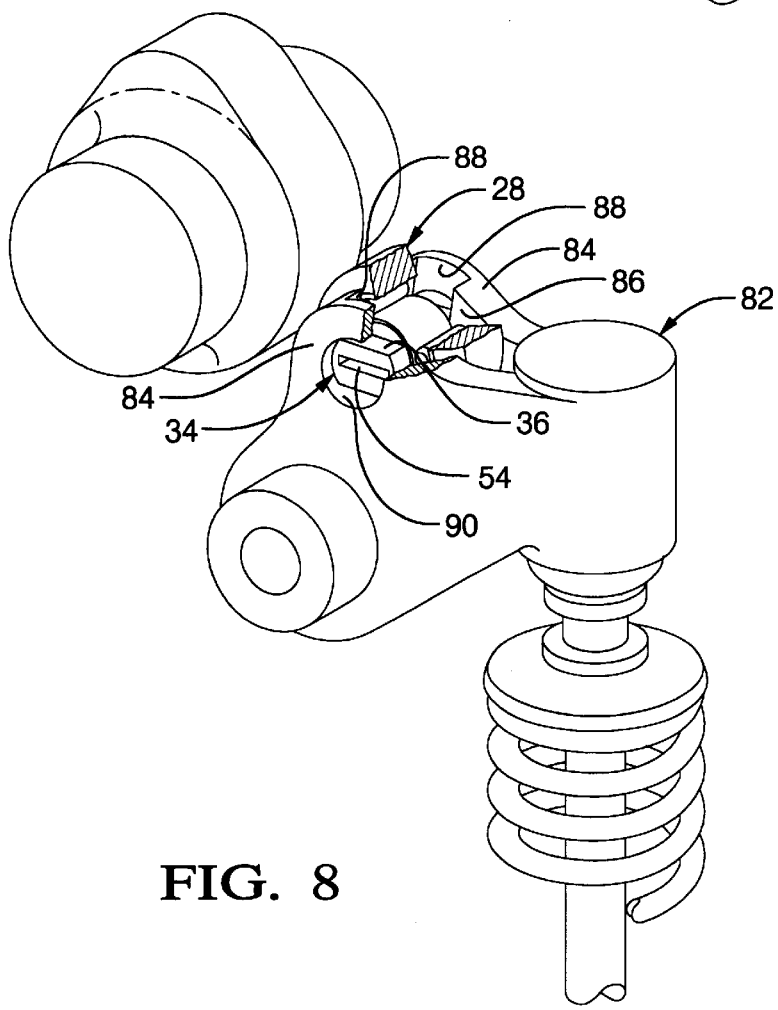
FIG. 8 is a pictorial view partly broken away to show an application of the invention to an engine rocker arm.

FIG. 8 illustrates the combination of a roller shaft assembly 28 according to the invention with a rocker arm 82. The rocker arm 82 includes arms 84 having inner sides 86 with slots 88 extending to shaft openings 90 to provide for installation of a roller shaft assembly 28 into the rocker arm 82 in the same manner as previously described with respect to the other embodiments shown. Thus, further description is believed unnecessary.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted, by the language of the following claims.

What is claimed is:

1. A roller follower lifter for use in engines and adapted for actuating a mechanism of an engine in response to motion of a rotating eccentric, said follower lifter comprising:

a follower body including spaced arms defining an intermediate roller pocket, shaft openings through said arms and aligned on a transverse axis, and opposed parallel slots narrower than the shaft openings and formed in inner sides of said arms, said slots extending from said shaft openings to distal ends of the arms; and a roller assembly including a shaft having a diameter and a follower roller, the shaft extending on a transverse axis and supported by the follower roller upon engagement with an associated eccentric, said shaft including a cylindrical central portion and ends extending axially from the central portion, the central portion mounting the follower roller and received within the pocket and the ends extending into said shaft openings for retaining the roller assembly within the pocket, said ends including parallel flats slidably receivable within said slots for installing the roller assembly in the pocket from said distal ends of the arms, said shaft then being rotated a quarter turn to misalign the flats and slots and engage the shaft with adjacent sides of the shaft openings for retaining the shaft in fixed position in said openings.

2. A roller follower lifter as in claim 1 wherein said eccentric is a cam and said follower lifter is a roller cam follower.

3. A roller follower lifter as in claim 1 wherein at least one end of said shaft includes a tool engageable portion for use in rotation of the shaft to said fixed position after insertion in the body.

4. A roller follower lifter as in claim 1 wherein said shaft and roller are loosely fitted for installation of the roller assembly through said slots wherein said shaft diameter fits in the shaft openings for positively fixing the shaft against rotation from said fixed position in the openings.

5. A roller follower lifter as in claim 1 wherein said roller assembly includes rolling bearings between the roller and shaft.

6. A roller follower lifter as in claim 5 wherein said bearings are needle bearings and said follower includes washers between the bearings and said inner sides of the arms to prevent any entry of the bearings into said slots.

7. A roller follower lifter as in claim 1 wherein one of said shaft and roller has a surface made from a bearing material and directly engaging the other of said shaft and roller.

8. A roller follower lifter as in claim 1 wherein said follower lifter is a valve lifter.

* * * * *